March 5, 1968 J. J. KONEN, JR., ETAL 3,372,383
INFORMATION RETRIEVAL SYSTEM
Filed Aug. 20, 1964
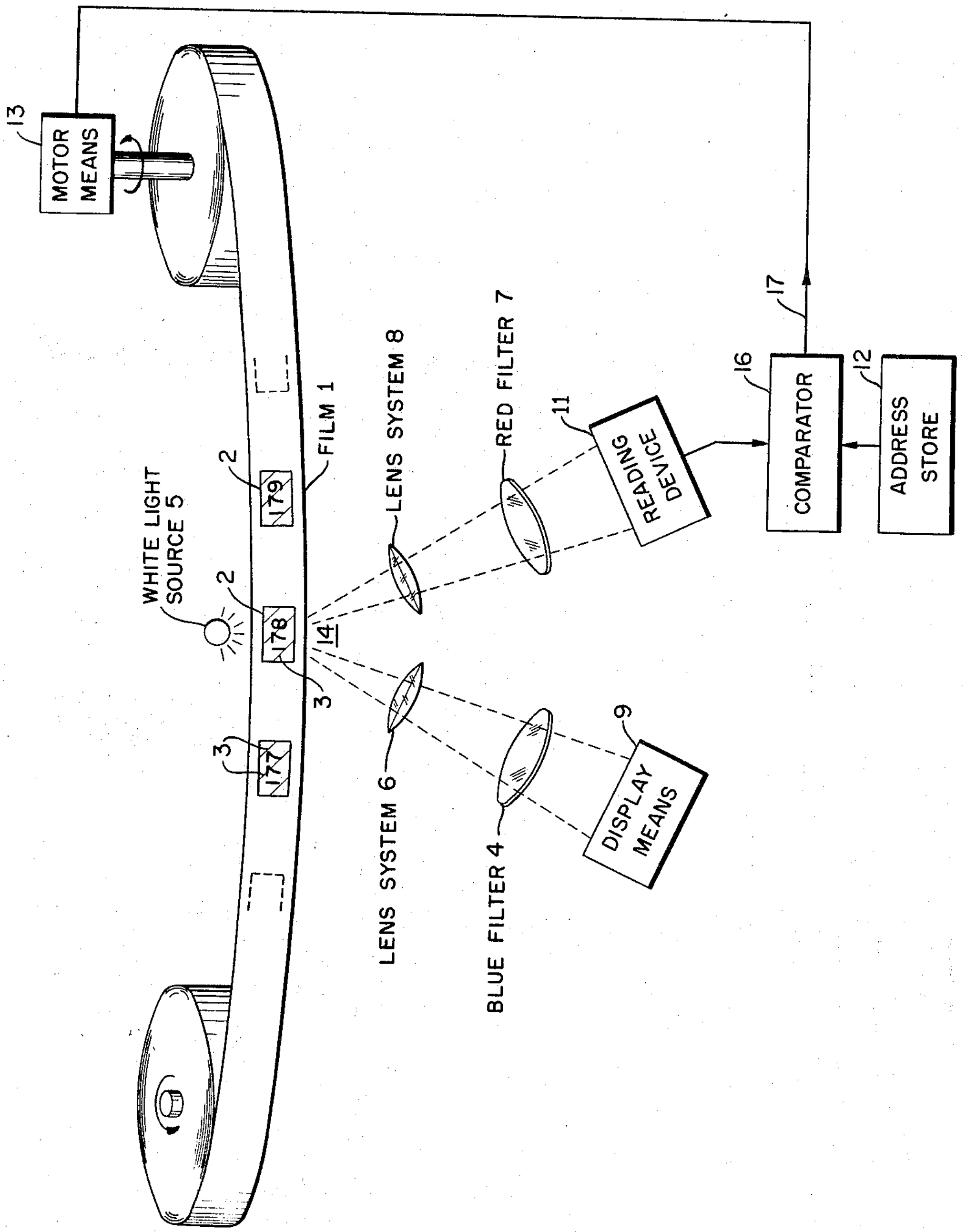
INVENTORS.
JACOB J. KONEN, JR.
MAX K. MUIR
BY
Robert L. Nathans
ATTORNEY United States Patent Office 3,372,383
Patented Mar. 5, 1968

3,372,383

INFORMATION RETRIEVAL SYSTEM

Jacob J. Konen, Jr., and Max K. Muir, San Diego, Calif., assignors to General Dynamics Corporation, Rochester, N.Y., a corporation of Delaware Filed Aug. 20, 1964, Ser. No. 390,958
3 Claims. (Cl. 340—173)

The present invention relates to information retrieval systems which utilize photographic film as a storage medium.

Prior art information retrieval systems generally utilize a storage medium having first areas containing information to be retrieved and having second areas physically correlated with the first areas, which second areas contain indexing or access information. Address means are provided adjacent the second areas for comparing address or access data with the indexing information as the storage medium is moved. When the indexing information adjacent the address means is equal to the address data, a readout signal is generated to enable readout of the information to be retrieved stored in a particular first area. The use of separate data storage areas for information to be retrieved and for the indexing information involves a waste of the storage medium.

Accordingly, it is the principal object of the present invention to provide a new and improved information retrieval system which utilizes photographic film having indexing information and information to be retrieved occupying the same area of film thereby to conserve the quantity of film needed to store a given amount of information to be retrieved.

Other objects and advantages of the present invention will become apparent from the following detailed description when considered in conjunction with the sole figure.

In accordance with the present invention, information to be retrieved is manifested upon a particular area of film by virtue of an image transparent to light of a first color. Indexing information is superimposed upon said particular area of film and is manifested by an image transparent to light of a second color. A source of light is positioned on one side of the film which emanates light having wavelengths corresponding to the first and second colors. An image manifesting means, such as a display screen or reproducer, is positioned on the other side of the film for manifesting only the information to be retrieved. A reading device, such as a conventional character recognition system, is also positioned on the other side of the film. A filter for passing light having the first color is positioned between the image manifesting means and the film so that only the information to be retrieved is directed at the image manifesting means. On the other hand, a filter for passing light having the second color is positioned between the reading device and the film so that only indexing information is picked up by the reading device or character recognition system. The film is moved until the character recognized by the reading device is equal to address information thereby to cause only the desired retrieved information to be manifested by the display means, or reproduced, as the case may be.

Film 1 is disclosed having a plurality of storage areas 2 thereon. Each storage area contains information to be retrieved schematically represented by lines 3. This information to be retrieved could be alphanumeric data or graphical data. In the storage areas, shown in the figure, the numbers one hundred seventy-seven, one hundred seventy-eight and one hundred seventy-nine represent indexing information which identify particular storage areas 2. Through the use of conventional photographic techniques, the information to be retrieved represented by lines 3 is photographically printed upon film 1 so that this information will appear blue when white light is shined through film 1. On the other hand, indexing information represented by the aforesaid numbers within storage areas 2 will appear red when white light is passed through film 1. Owing to the presence of white light source 5, blue filter 4, lens system 6, red filter 7 and lens system 8, only the information to be retrieved will be directed to display means 9, while only indexing information will be directed to reading device 11. Display means 9 could be a display screen or an image reproducer, such as a printer or camera, for manifesting the information to be retrieved. Reading device 11 could be virtually any of the well known character recognition circuits for reading the indexing information.

Let it be assumed that it is desired to display information to be retrieved contained within a storage area 2 which is indexed by the number one hundred seventy-eight. The number one hundred seventy-eight is inserted into address store 12 and motor means 13 is energized to drive film 1, which, in turn, causes the indexing numbers to be sequentially read by reading or character recognition device 11. When the one hundred seventy-eighth storage area is adjacent viewing area 14, comparator 16 generates a signal upon lead 17, which, in turn, causes the film to stop. The information to be retrieved within the one hundred seventy-eighth storage area is now manifested by display means 9 without the indexing information. Since the indexing information and the information to be retrieved occupies the same area of film 1, considerable savings of film are affected, while at the same time no indexing information is displayed along with the information to be retrieved.

The color film is prepared according to well known photographic techniques as follows. An image source which could be a cathode-ray tube is positioned adjacent to a color camera. The information to be later retrieved is manifested on the face of the cathode-ray tube in the color blue. A half-silvered mirror is positioned between the cathode-ray tube and the camera so that the information on the face of the cathode-ray tube passes through the half-silvered mirror and is recorded as the blue image upon the colorfilm within the camera. As the camera takes a sequence of pictures of the changing blue images upon the cathode-ray tube, the frame numbers are projected upon the half-silvered mirror by means of red light so that while the camera is sequentially photographing the blue images on the cathode-ray tube it is also sequentially photographing the frame numbers in red. The film is thereafter processed according to conventional techniques and is wound upon spools, as shown in the figure. The film could be of the type marketed under the trademarks "Ektachrome" or "Kodachrome."

While there has been shown and described a specific embodiment of the invention, other modifications will readily occur to those skilled in the art. It is not, therefore, desired that this invention be limited to the specific arrangement shown and described, and it is intended in the appended claims to cover all modifications within the spirit and scope of the invention.

What is claimed is:

1. An information retrieval system comprising, a film bearing a plurality of display images transparent to light of a first color and a plurality of indexing images transparent to light of a second color associated with said display images and occupying the same area of said film as said display images, a viewing area, means for driving said film to present particular display images with their associated indexing images to said viewing area, first filter means positioned on said one side of said film for transmitting said display images of said first color but not said indexing images of said second color, second filter means positioned on said one side of said film for transmitting particular ones of said indexing images of said second color but not said display images of said first color, and a light source positioned on the other side of said film for causing said display images of said first color to be directed at said first filter means and for causing said indexing images of said second color to be directed at said second filter means.

2. An information retrieval system comprising, a film bearing a plurality of display images transparent to light of a first color and a plurality of indexing images transparent to light of a second color associated with said display images and occupying the same area of said film as said display images, a viewing area, motor means for driving said film to present particular display images with their associated indexing images to said viewing area, image manifesting means positioned on one side of said film for manifesting particular ones of said display images, first filter means positioned between said one side of said film and said image manifesting means for transmitting said display images of said first color to said image manifesting means but not said indexing images of said second color, a reading device positioned on said one side of said film for reading said indexing images, second filter means positioned between said one side of said film and said reading device for transmitting particular ones of said indexing images of said second color to said reading device but not said display images of said first color, address means for storing a particular indexing designation, means for actuating said motor means until the indexing image being read by said reading device is equivalent to said indexing designation stored in said address means, and a light source positioned on the other side of said film for causing said display images of said first color to be directed at said first filter means and for causing said indexing images of said second color to be directed at said second filter means.

3. An information retrieval system comprising, a film bearing a plurality of display images transparent to light of a first color and a plurality of indexing images transparent to light of a second color associated with said display images and occupying the same area of said film as said display images, a viewing area, motor means for driving said film to present particular display images with their associated indexing images to said viewing area, display means positioned on one side of said film for displaying particular ones of said display images, first filter means positioned between said one side of said film and said display means for transmitting said display images of said first color to said display means but not said indexing images of said second color, a reading device positioned on said one side of said film for reading said indexing images, second filter means positioned between said one side of said film and said reading device for transmitting particular ones of said indexing images of said second color to said reading device but not said display images of said first color, address means for storing a particular indexing designation, means for actuating said motor means until the indexing image being read by said reading device is equivalent to said indexing designation stored in said address means, and a light source positioned on the other side of said film for causing said display images of said first color to be directed at said first filter means and for causing said indexing images of said second color to be directed at said second filter means.

References Cited

UNITED STATES PATENTS

| | | | |
|---|---|---|---|
| 3,113,179 | 12/1963 | Glenn | 178—66 |
| 3,138,783 | 6/1964 | Toulmin | 340—173 |
| 3,312,955 | 4/1967 | Lamberts et al. | 340—173 |
| 3,314,052 | 4/1967 | Luhmann | 340—173 |

TERRELL W. FEARS, *Primary Examiner.*